March 29, 1960

G. E. FLINN 2,930,258

TRANSMISSION

Filed Jan. 25, 1955

Inventor:
George E. Flinn
By:
Keith J. Bleuer  Atty

March 29, 1960

G. E. FLINN 2,930,258

TRANSMISSION

Filed Jan. 25, 1955

Inventor:
George E. Flinn
By:
Keith J. Blew Atty.

United States Patent Office 2,930,258
Patented Mar. 29, 1960

2,930,258

TRANSMISSION

George E. Flinn, Muncie, Ind., assignor to Borg-Warner Corporation, Chicago, Ill., a corporation of Illinois Application January 25, 1955, Serial No. 483,981

5 Claims. (Cl. 74—763)

My invention relates to transmissions and more particularly to transmissions for heavy vehicles such as trucks.

It is an object of my invention to provide an improved heavy duty truck transmission which has eight speeds in forward drive. It is contemplated that these speeds shall preferably be equally spaced, that is, each of the speeds from the next highest successively to the lowest has a value equal to a constant multiplied by the speed ratio of the next higher speed ratio.

It is another object of the invention to provide two planetary assemblies connected in tandem with one of the assemblies providing four speed ratios in one direction of drive and the other assembly providing two speed ratios in one direction of drive and also a reverse drive so as to obtain the eight speed ratios previously mentioned.

It is also an object of the invention to provide a hydraulic torque converter in the three lower drives of the first planetary assembly so that first, second and third as well as fifth, sixth and seventh speed drives include the hydraulic torque converter and may utilize its torque multiplying abilities.

It is also an object to so construct the first planetary assembly that changes from second to third and from third to fourth speed ratios are obtained by dropping only one friction engaging device and engaging another and that a change from first to second speed ratios may be obtained simply by engaging one friction engaging device, with the first speed ratio including a one-way unit which automatically disengages on engagement of the last-mentioned friction engaging device.

It is also an object of the invention to provide an improved force transmitting arrangement for a friction clutch which includes a plurality of sectors acting as levers or struts for transmitting force from a piston to a pressure plate.

The invention consists of the novel constructions, arrangements and devices to be hereinafter described and claimed for carrying out the above-stated objects and such other objects as will apear from the following description of a preferred embodiment of the invention, illustrated with reference to the accompanying drawings, wherein:

Like characters of reference designate like parts in the several views.

Figure 1:
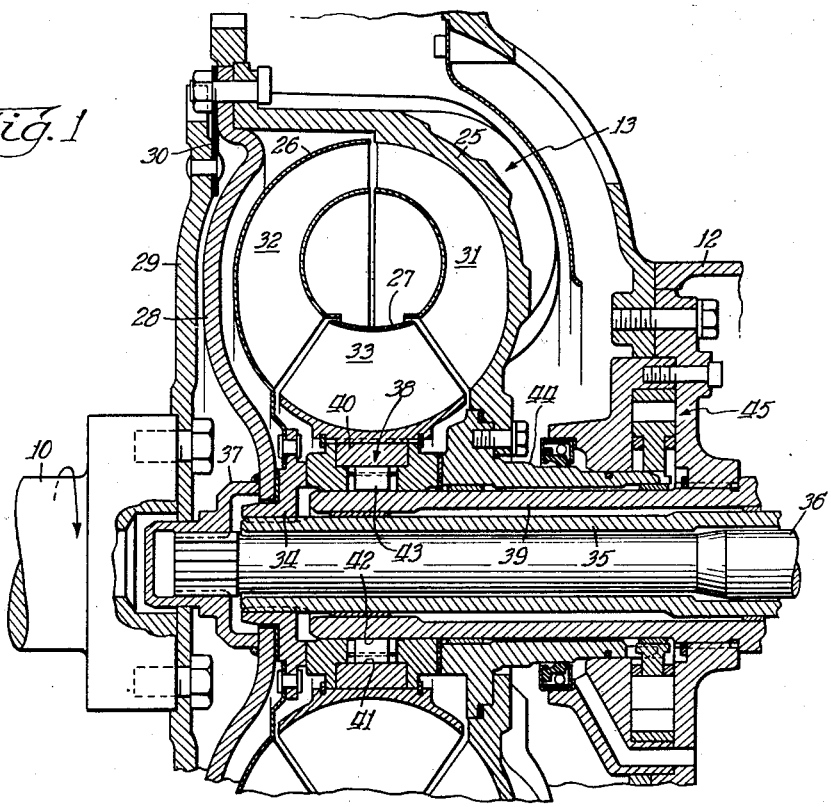
Fig. 1 is a longitudinal, sectional view of a hydraulic torque converter which is attached to the structure shown in Fig. 2 to form a complete transmission embodying the principles of the invention.
Figure 3:
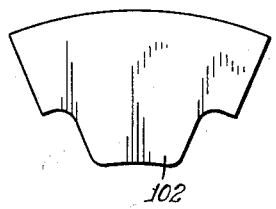
Fig. 3 is a plan view of a clutch applying strut utilized in the transmission as illustrated in the above two figures.
Figure 4:
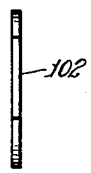
Fig. 4 is a side view of the strut shown in Fig. 3.
Figure 2:
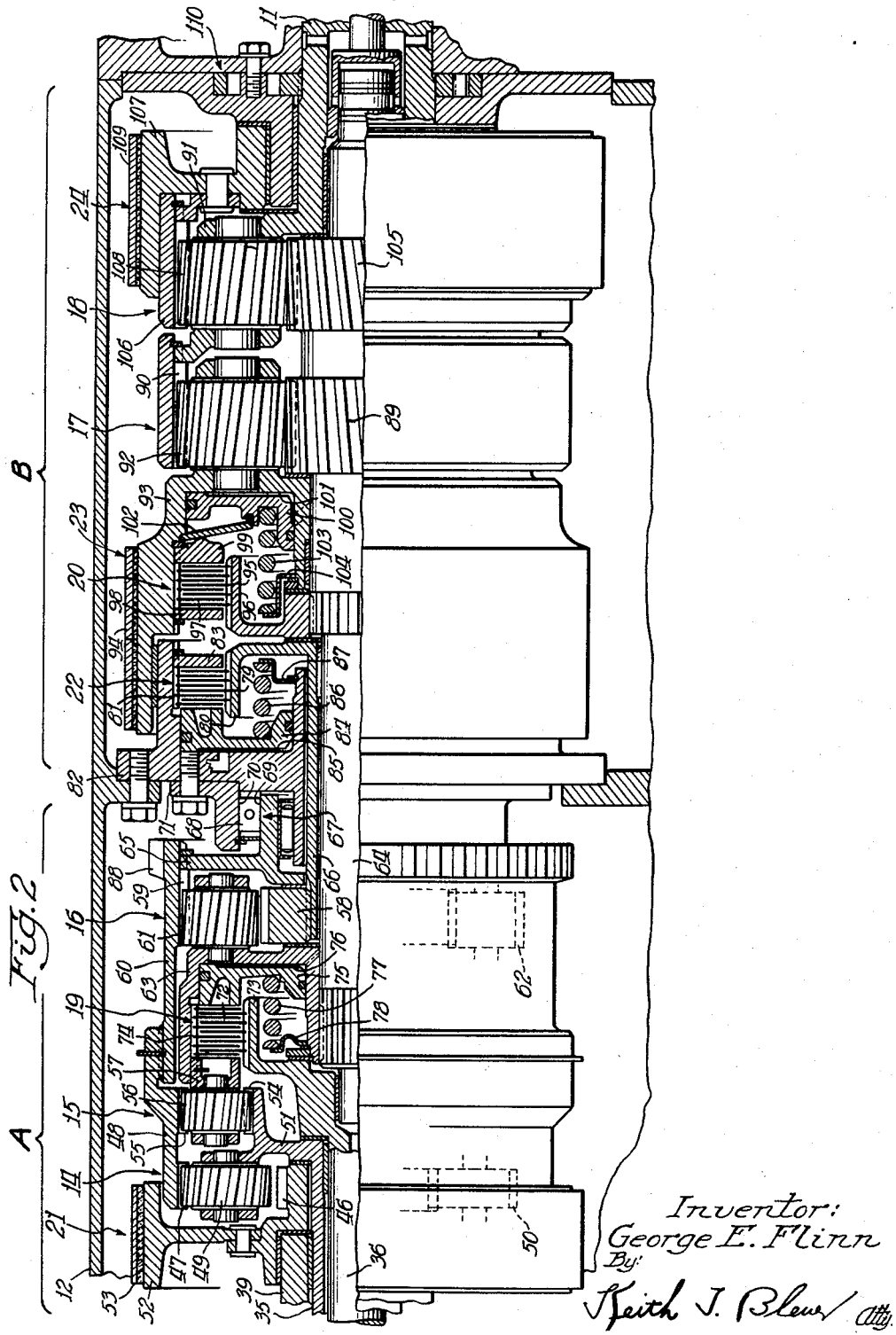
Fig. 2 is a longitudinal, sectional view of the gearing of my improved transmission which is attached to the hydraulic torque converter shown in Fig. 1 to form the complete transmission.

Referring now to the drawings, the illustrated transmission comprises, in general, a drive shaft 10, a driven shaft 11, both of which are rotatably disposed within and with respect to a transmission casing 12, a hydraulic torque converter 13, planetary gear sets 14, 15, 16, 17 and 18, friction clutches 19 and 20, and friction brakes 21, 22, 23 and 24.

The hydraulic torque converter 13 is of a well-known type comprising a fluid impeller 25, a runner or driven element 26 and a stator or reaction element 27. The impeller 25 is fixed with respect to an annular closure plate 28 and forms with the plate 28 a fluid housing for the hydraulic torque converter. The impeller 25 and closure plate 28 are connected with a fly wheel 29, which in turn is fixed with respect to the drive shaft 10, by means of relatively thin plates 30 of spring material allowing certain slight axial movement of the flywheel 29 and shaft 10 with respect to the impeller 25.

The impeller 25, runner 26 and stator 27 are provided with the usual impeller, runner aand stator blades 31, 32 and 33. The runner 26 is fixed to a hub 34 that is splined on a sleeve shaft 35. The sleeve shaft 35 surrounds a center shaft 36 which is fixed to rotate with the closure plate 28 by means of a hub member 37 welded to the closure plate 28 and splined on the shaft 36. A one-way brake unit 38 is disposed between the stator 27 and a sleeve shaft 39 that is fixed with respect to the transmission casing 12. The one-way brake unit 38 comprises a cylindrical outer hub 40 fixed with respect to the stator 27 and having an inwardly facing cylindrical race surface 41. An outwardly facing cylindrical race surface 42 is provided on the shaft 39, and tiltable sprags 43 are provided between the surfaces 41 and 42 and are arranged to tilt and engage the surfaces 41 and 42 so as to prevent rotation of the hub 40 and the stator 27 in the reverse direction, that is, in the direction opposite to that in which the drive shaft 10 is driven from the vehicle engine, but the sprags 43 tilt and release so as to allow free rotation of the stator 27 in the forward direction. A sleeve shaft 44 surrounding the shaft 39 is fixed to the impeller 25, and a pump 45 of any suitable construction is driven from the shaft 44.

The constructions of the hydraulic torque converter 13 and the one-way unit 38 are well-known, and hence further details of construction are not deemed necessary. The fluid in the torque converter housing is driven by the impeller blades 31 so that it flows toroidally from the blades 31 to the runner blades 32 and from thence to the stator blades 33 and back again into the blades 31. The blades 33 are so shaped as to turn the liquid in the torque converter causing it to impinge on the blades 31 in the same direction the blades 31 are turning, while the blades 32 are so shaped as to receive energy from the fluid as it comes from the impeller blades 31, the result being that the runner 26 is driven at reduced speed but increased torque, and the reaction element 27 takes a reaction in the reverse direction for causing this increase in torque, the stator being held from turning in this direction by the one-way brake 38. As is well known in connection with such torque converters, after the speed of the runner increases sufficiently, the reactive force on the stator 27 falls to zero and actually reverses, tending to drive the stator in the forward direction; and, at this time, the one-way unit 38 releases allowing such rotation of the stator 27; and the hydraulic unit 13 then functions as a simple fluid coupling.

The planetary gear unit 14 comprises a sun gear 46, a ring gear 47 formed in a ring gear element 48, a set of planet gears 49 in mesh with the ring gear 47, a set of planet gears 50 each in mesh with one of the gears 49 and also with the sun gear 46, and a planet gear carrier 51 rotatably carrying the gears 49 and 50. The carrier 51 is formed on the shaft 35, and the sun gear 46 is rotatably disposed on the latter shaft. The brake 21 is effective on the sun gear 46 and comprises a brake drum 52 fixed to the sun gear 46 and a brake band 53 contractible on and engageable with the drum 52.

The planetary gear set 15 comprises a sun gear 54 formed on the planet gear carrier 51, a ring gear 55 formed in the ring gear element 48, a set of planet gears 56 in mesh with the gears 54 and 55 and rotatably carried by a planet gear carrier 57.

The planet gear set 16 comprises a sun gear 58, a ring gear 59 formed in a ring gear element 60, a set of planet gears 61 in mesh with the ring gear 59, a set of planet gears 62 each in mesh with one of the gears 61 and also with the sun gear 58 and a planet gear carrier 63 rotatably carrying the gears 61 and 62. The carrier 63 is splined to the carrier 57 and is also splined to a shaft 64 piloted within the shafts 36 and 11. The ring gear element 60 is splined with respect to the ring gear element 48 and is also splined to a hub member 65. The sun gear 58 is splined on a sleeve shaft 66 surrounding the shaft 64.

A one-way brake 67 is provided for the hub member 65 and comprises tiltable sprags 68 disposed between and engageable with inner and outer cylindrical race surfaces 69 and 70 provided respectively on the hub member 65 and on an outer race member 71 fixed with respect to the transmission casing 12. The one-way unit 67 is similar to the unit 38 previously described and functions to prevent reverse rotation of the hub member 65 and thereby of the ring gear elements 60 and 48 connected therewith.

The clutch 19 comprises a plurality of clutch disks 72 splined on an enlarged end portion 73 of the shaft 36 and interleaved with clutch disks 74 splined within the planet gear carrier 63. An annular piston 75 is slidably disposed in an annular cavity 76 formed in the carrier 63 and functions to compress the stacked disks 72 and 74 between the piston and the opposite end of the planet gear carrier 57. A return spring 77 is disposed between the piston 75 and an annular spring retainer 78 fixed with respect to the planet gear carrier 63.

The brake 22 comprises a plurality of brake disks 79 splined on an enlarged end 80 of the shaft 66 and a plurality of disks 81 interleaved with the disks 79 and splined within a casing portion 82 fixed with respect to the housing 12. A backing plate 83 is splined in the casing portion 82 on one end of the stacked disks 79 and 81, and a piston 84 is provided at the other end of the stacked disks 79 and 81 to compress the disks between the piston and backing plate in frictional engagement with each other. The piston 84 is annular in shape and is slidably disposed in an annular cavity 85 provided in the casing portion 82. A return spring 86 is disposed between the piston and an annular spring retainer 87 fixed to the casing portion 82.

An external ring gear 88 may be provided on the ring gear element 60 for power take-off purposes as will hereinafter be described.

The planet gear set 17 comprises a sun gear 89 formed on the shaft 64, a ring gear 90 carried by a planet pinion carrier 91, a set of planet gears 92 in mesh with the sun gear 89 and ring gear 90 and a planet pinion carrier 93 on which the pinions 92 are rotatably disposed.

The carrier 93 is rotatably disposed on the shaft 64 and provides an external cylindrical drum surface for the brake 23. The brake 23 comprises a brake band 94 contractible on and engageable with the drum surface on the carrier 93.

The clutch 20 comprises a plurality of clutch disks 95 splined on a hub 96 that in turn is splined on the shaft 64, a plurality of clutch disks 97 interleaved with the disks 95 and splined within the carrier 93, a backing plate 98 fixed in the carrier 93 on one end of the stacked disks 95 and 97 and a movable pressure plate 99 splined in the carrier 93 on the other end of the disks 95 and 97. An annular clutch apply piston 100 is slidably disposed within an annular cavity 101 in the carrier 93 and has a force transmitting connection with the pressure plate 99 comprising a plurality of sectors 102 which are pivotally fixed within the carrier 93 at their outer peripheries and are acted on at their inner peripheries by the piston 100 in order to move the plate 99 in the clutch engaging direction. The sectors preferably utilize the complete 360°. A piston return spring 103 is provided, and this spring is disposed between the piston 100 and an annular spring retainer 104 fixed with respect to the carrier 93.

The gear set 18 comprises a sun gear 105 cut on the shaft 64, a ring gear 106 carried by a brake drum 107 and a set of planet gears 108 in mesh with the sun gear 105 and the ring gear 106 and rotatively carried by the carrier 91. The brake 24 comprises a friction band 109 adapted to be contracted on and to engage the drum 107.

A fluid pump 110 of any suitable type is driven by the driven shaft 11, and this pump may be utilized in conjunction with the pump 45 for providing a suitable source of fluid pressure for engaging the brakes and clutches of the transmission. In connection with the brakes 21, 23 and 24; a conventional movable piston in a fluid pressure cylinder (not shown) may be used for engaging each of the brakes.

The illustrated transmission provides first, second, third, fourth, fifth, sixth, seventh and eighth speeds in forward drive and a reverse drive. In providing these drives, the primary planetary gear assembly A which comprises the planet sets 14, 15 and 16, the brakes 21 and 22 and the clutch 19 provides four forward drive speeds, and the secondary planetary gear assembly B comprising the planet sets 17 and 18, the brakes 23 and 24 and the clutch 20 provides two forward speed drives and a reverse drive.

The first forward speed drive is obtained by engaging the brake 24, and the drive in this case is from the drive shaft 10 through the fly wheel 29, and impeller 25, the runner 26, the shaft 35, the sun gear 54, the planet gears 56, the planet gear carrier 57, the planet gear carrier 63, the shaft 64, the sun gear 105, the planet gears 108 and the planet gear carrier 91 to the driven shaft 11. For this drive, the planet gear set 15 functions to drive its output element, which is the gear carrier 63, at an increased torque, and the ring gear 55 of the planet gear set 15 is the reaction element for the gear set. The ring gear 55 is braked by the one-way brake 67 functioning through the hub member 65 and ring gear element 60 connected to the ring gear element 48 in which the ring gear 55 is formed, and the one-way brake 67 thus completes the drive and is a necessary element to the drive. The planet gear set 18 is also effective in this drive, and the ring gear 106 is the reaction element of the gear set 18 which is held from reverse rotation by the brake 24. It will be apparent that, since the one-way brake 67 is effective in this drive, this drive is a free-wheeling drive, that is, the shaft 11 may freely rotate in the forward direction without being restrained by the shaft 10 and the vehicle engine driving the shaft 10. For certain sizes of gears, the gear set 15 may provide a ratio of 2.56 and the gear set 18 may provide a ratio of 3.52 so that the overall ratio between the shaft 35 and the shaft 11 is the product of these figures, namely, 9.02. The shaft 35 carries and has fixed thereto the runner 26, and the shaft 35 is thus driven by the converter 13 which multiplies torque with respect to that impressed on the drive shaft 10 by the vehicle engine at low speeds of the runner 26, as has been heretofore explained.

The transmission is changed from first speed forward drive to second speed forward drive by engaging the brake 22, allowing the brake 24 to remain engaged. The brake 22 is engaged simply by applying fluid pressure to the back of the piston 84 so as to compress the stacked plates 81 and 79 between the piston 84 and the backing plate 83. The brake 22 functions to hold the shaft 66 and thereby the sun gear 58 of the planet gear set 16 against rotation. As has just been described in connection with low speed drive, the carrier 63 is rotated in the forward direction by the gear set 15. Since the sun gear 58 is held stationary for second speed drive, the planet gear set 16 functions to drive the ring gear element 60 in the forward direction at a reduced speed with respect to that of the carrier 63, since the gear set 16 is of the duplex planet gear type. Under these conditions, the one-way brake 67 overruns. The ring gear 55 is connected with the ring gear element 60, and thus the speed of the carrier 63 connected with the shaft 64 as increased with respect to its speed in low speed forward drive. The drive through the transmission is otherwise the same as in low speed forward drive, and for second speed drive, the action of the two planet gear sets 15 and 16 cooperating together as just described produces, for a certain embodiment of the transmission, a speed ratio of 1.87 (instead of 2.56 as in low speed drive) between the shafts 35 and 64 so that the overall speed ratio between the shafts 39 and 11 is now the product of 1.87 and 3.52 namely, 6.58. The torque multiplication of the rear gear set 18 remains the same at 3.52, since the brake 24 remains engaged. Since one-way brake 67 for this drive overruns, this drive is a two-way drive. The torque converter 13 drives the shaft 35 for second speed drive, as well as in all other drives during which the shaft 35 functions as an input shaft and which will later be described, the same as for low speed drive, converting torque at low runner speeds and acting as a simple fluid coupling at higher runner speeds.

The transmission is changed from second speed forward drive to third speed forward drive by disengaging the brake 22 and instead engaging the brake 21, allowing the brake 24 to remain engaged. The carrier 51, as is described in connection with low speed drive, is driven in the forward direction from the shaft 35 and the torque converter 13; and the planet gear set 14, being of the duplex type and having its sun gear 46 held from rotation by the brake 21, drives the ring gear element 48 in the forward direction at a reduced speed, the ring gear element 48 being driven, however, at a faster speed than it is driven by the planet gear set 16 in second speed drive. The sun gear 54 of the gear set 15 is driven as in the previous drives in the forward direction, and the rotation of the sun gear 54 and ring gear 55 of the gear set 15 causes the carrier 57 of the gear set and thus the shaft 64 to be driven at an increased speed of rotation in the forward direction. The gear sets 14 and 15, for the particular embodiment of the transmission referred to above, produce a ratio of 1.37 between the shafts 35 and 64, and the overall torque ratio between the shafts 35 and 11 thus is the product of 1.37 for the gear sets 15 and 14 and 3.52 for the gear set 18 which is 4.82. The drive is the same as in the previous speed ratios, except, in this third speed forward drive, drive takes place through both of the gear sets 14 and 15 as described.

For changing from third speed forward drive to fourth speed forward drive, the brake 21 is disengaged and the clutch 19 is engaged. The clutch 19 functions to provide a direct drive from the shaft 10 to the shaft 64 exclusive of the torque converter 13, the drive being from the shaft 10 through the fly wheel 29, the plate 28, the hub member 37, the shaft 36, the clutch 19 and the carrier 63 to the shaft 64. The clutch 19 is engaged simply by applying fluid under pressure behind the piston 75 so as to compress the stacked disks 72 and 74 between the piston 75 and the carrier 57. For the particular embodiment mentioned above, the overall ratio between the shafts 10 and 11 is 3.52 which is only that ratio produced by the rear planetary assembly B.

The transmission is changed from fourth speed to fifth speed forward drive by disengaging the clutch 19 and brake 24 and engaging the clutch 20. The clutch 20 may be engaged simply by applying fluid under pressure behind the piston 100, and this piston acts through the struts 102 on the pressure plate 99 compressing the clutch disks 97 and 95 between the pressure plates 98 and 99. The clutch 20 connects together the carrier 93 and the shaft 64 on which the sun gear 89 is formed, thus locking up the gear set 17 so that all of its parts rotate as a unit. The ring gear 90 of the gear set 17 thus rotates along with and at the same speed as the shaft 64, and the ring gear 90 is connected through the carrier 91 of the gear set 18 with the shaft 11 so that the shafts 64 and 11 are effectively connected directly together. The same power train through the converter 13 and gear assembly A exists for this fifth speed drive as for first speed drive. The one-way brake 67 is effective for this drive to brake the ring gear element 48 from reverse rotation, so that the planet gear set 15 is effective the same as in first speed drive for driving the shaft 64 at a certain reduced speed ratio with respect to the shaft 35, which is in turn driven from and through the torque converter 13. The overall speed ratio between the shafts 35 and 11 is that provided by the planetary assembly A which is 2.56 for the particular embodiment previously mentioned.

The transmission may be changed from fifth to sixth speed forward drive by engaging the brake 22, so that the planetary assembly A drives the shaft 64 from the shaft 35 the same as in second speed forward drive. The clutch 20 remains engaged for effectively directly connecting the shafts 64 and 11, so that the ratio between the shafts 35 and 11 is that produced solely by the gear sets 15 and 16 as in second speed drive which is 1.87 for the particular embodiment mentioned.

The change from sixth to seventh speed forward drive is obtained by disengaging the brake 22 and instead engaging the brake 21. The planet gear sets 14 and 15 drive the same as in third speed forward drive, causing the shaft 64 to be driven at a reduced speed with respect to the shaft 35. The clutch 20 remains engaged directly connecting the shafts 64 and 11, so that the overall ratio between the shafts 35 and 11 is that produced solely by the gear sets 14 and 15. For the particular embodiment previously mentioned, the gear sets 14 and 15 produce a ratio of 1.37, so that this is also the ratio between the shafts 35 and 11.

For a change from seventh speed to eighth speed forward drive, the clutch 19 is engaged and the brake 21 is disengaged. The clutch 20 remains engaged. The shaft 64 for this drive is driven directly from the shaft 10 through the clutch 19 as was described in connection with fourth speed drive, and the shafts 64 and 11 are directly connected by the clutch 20, as described, so that the overall ratio between the shafts 10 and 11 is a direct drive.

In recapitulation, the torque multiplication between the shafts 10 and 11 in first, second, third, fifth, sixth and seventh speeds forward drive is produced by the tandem connected planetary assemblies A and B and the torque converter 13. The clutch 19 is engaged for the fourth and eighth speed forward drives, so that the torque converter 13 is not in either of these drives. The speed ratio between the shafts 10 and 11 in fourth speed drive is that produced by the gear set 18 alone, and the eighth speed forward drive is a direct drive. The one-way brake 67 is effective to take the reaction of the gear set 15 for first and fifth speed forward drives, so these drives are both free-wheeling drives, while the other forward drives are two-way drives.

A first reverse drive is obtained by engaging the brake 23. The shaft 64 is driven through the same power train, with the one-way brake 67 being engaged, as for low speed forward drive. The brake 23 functions to hold the carrier 93 of the gear set 17 stationary, so that when the sun gear 89 is driven through the shaft 64, the ring gear 90 is driven in the reverse direction at a reduced speed through the planet gears 92 of the gear set 17. The ring gear 90 is connected through the carrier 91 with the driven shaft 11, and the latter shaft is likewise driven at a reduced speed in reverse drive. For the particular embodiment of the invention previously mentioned, the planet gear set 15 in this drive provides a 2.56 gear ratio, and the gear set 17 provides a 2.52 speed ratio, so that the overall speed ratio between the shafts 35 and 11 is the product of these two which is 6.45. The torque converter 13 drives the shaft 35 as in first speed forward drive. Since the one-way brake 67 is effective, reverse drive like first and fifth speed forward drives, is a freewheeling drive.

A second reverse drive may be obtained by engaging the brake 22, allowing the brake 23 to remain engaged. The shaft 64 is driven through the same power train as for second speed forward drive, and the shaft 11 is driven by the shaft 64 through the gear set 17 the same as in the first reverse drive just described. For the particular embodiment of the invention previously mentioned, the front gearing unit A provides a 1.87 speed ratio, and the gear set 17 continues to provide the 2.52 speed ratio, so that the overall speed ratio between the shafts 35 and 11 is the product of these two which is 4.71. The torque converter 13 drives the shaft 35 as in the previously described reverse drive.

A third reverse drive may be obtained by disengaging the brake 22 and instead engaging the brake 21, allowing the brake 23 to remain engaged. The shaft 64 is driven through the torque converter 13 and the gear assembly A the same as in third speed forward drive, and the shaft 11 is driven through the gear set 17 from the shaft 64 the same as in the previously described reverse drives. For the particular embodiment of the invention, the gear assembly A provides a 1.37 speed ratio, and the gear set 17 continues to provide a 2.52 speed ratio, so that the overall speed ratio between the shafts 35 and 11 is the product of the two which is 3.45.

A fourth reverse drive is obtained by disengaging the brake 21 and instead engaging the clutch 19. The drive to the shaft 64 is the same as in fourth speed forward drive, and the drive between the shafts 64 and 11 is the same as in the previously described reverse drives. The clutch 19 drives the shaft 64 directly from the drive shaft 10, and the gear set 17 continues to provide 2.52 speed ratio, so that the overall speed ratio between the shafts 10 and 11 is 2.52.

In order to clarify the changes in engagement between the brakes and clutches that must be made in order to change between the various drives, the following table indicating the various brakes and clutches that are engaged, as well as showing the speed ratios of the various units with the particular embodiment of the transmission above referred to, is set forth below.

| Gear | Elements Used | | Ratios | | Overall Ratio |
|---|---|---|---|---|---|
| | Ft. Unit A | R. Unit B | Ft. Unit A | R. Unit B | |
| 1st | $B_{67}$ | $B_{24}$ | 2.56 | 3.52 | 9.02 |
| 2nd | $B_{22}$ | $B_{24}$ | 1.87 | 3.52 | 6.58 |
| 3rd | $B_{21}$ | $B_{24}$ | 1.37 | 3.52 | 4.82 |
| 4th | $C_{19}$ | $B_{24}$ | 1.00 | 3.52 | 3.52 |
| 5th | $B_{67}$ | $C_{20}$ | 2.56 | 1.00 | 2.56 |
| 6th | $B_{22}$ | $C_{20}$ | 1.87 | 1.00 | 1.87 |
| 7th | $B_{21}$ | $C_{20}$ | 1.37 | 1.00 | 1.37 |
| 8th | $C_{19}$ | $C_{20}$ | 1.00 | 1.00 | 1.00 |
| Rev.1 | $B_{67}$ | $B_{23}$ | 2.56 | 2.52 | 6.45 |
| Rev.2 | $B_{22}$ | $B_{23}$ | 1.87 | 2.52 | 4.71 |
| Rev.3 | $B_{21}$ | $B_{23}$ | 1.37 | 2.52 | 3.45 |
| Rev.4 | $C_{19}$ | $B_{23}$ | 1.00 | 2.52 | 2.52 |

The transmission may be changed in speed ratio arbitrarily in any manner that the vehicle operator desires by any suitable controls (not shown). However, I have found that a very advantageous manner of changing speed ratio is that set forth by the chart below:

| Speed | Range | | | | | |
|---|---|---|---|---|---|---|
| | Drive | | $L_1$ | | $L_2$ | |
| | C To Full Throttle | Full Throttle and Kickdown | Upshift | Automatic Downshift Any Throttle | Upshift | Automatic Downshift Any Throttle | Reverse |
| 1 | | | | | 9.02 | | |
| 2 | | | | | 6.58 | 6.58 | |
| 3 | 4.82 | 9.02 | 4.82 | 4.82 | | 4.82 | |
| 4 | | 6.58 | | 3.52 | | 3.52 | |
| 5 | 2.56 | 4.82 | | | | | |
| 6 | | 3.52 | | 1.87 | | 1.87 | |
| 7 | 1.37 | 2.56 | | 1.37 | | | |
| 8 | 1.00 | 1.87 | | | | | |

The above chart illustrates that the transmission may be utilized for driving forwardly advantageously in three different ranges, namely, Drive, $L_1$ and $L_2$. The Drive range is particularly adapted for use in driving a truck on level roads. The vehicle may be started with the vehicle accelerator being in its throttle operating range between closed throttle and full throttle in the third speed ratio and the transmission may be subsequently to fifth speed ratio, then to seventh speed ratio and finally to eighth speed ratio, and these ratios have sufficient steps between them so that sufficient acceleration and performance are provided. In this Drive range, when the accelerator is moved to a full throttle or kickdown position beyond the throttle operating range of the accelerator, the transmission is preferably changed from eighth to seventh and through each of the lower ratios until first is reached, the changing into the lower ratios taking place as the vehicle speed decreases.

The $L_1$ range is particularly useful when more driving torque is desired for negotiating the truck over small hills. A start is made in this range in the third speed ratio, and continued driving is done in this speed ratio. Assuming that the vehicle is travelling in the Drive range and then a change is made to the $L_1$ range, for suitable performance a change may be made from the eighth speed ratio to the seventh, from thence to the sixth and from the sixth to the fourth and from the fourth to the third with decreasing vehicle speeds, any throttle opening existing, as shown on the chart.

The $L_2$ range is for the purpose of providing still greater driving torque for driving the truck over still steeper hills. In the $L_2$ range, the transmission may initially be put in its first speed and then may be changed to its second speed. Assuming that the transmission is driving in its Drive range and is then changed to its $L_2$ range, for suitable performance a change at any throttle opening may be made from either seventh or eighth speed ratio to the sixth speed ratio and from thence to the fourth speed ratio and subsequently to the third and second speed ratios, as the speed of the vehicle decreases.

Any suitable gearing may be used in connection with the ring gear 88 on the ring gear element 60 for taking power off from the transmission and vehicle engine for driving any desired auxiliary apparatus. The ring gear element 60 rotates in all of the drives with the exception of first and fifth forward drives, and the power take-off is useful in all of the other drives. If the brakes 24 and 23 and the clutch 20 are maintained disengaged and the transmission is thus in neutral condition, rotation of the gear 88 for power take-off purposes may be caused simply by engaging either the brake 22 or the brake 21.

The brake 21 may advantageously be maintained engaged in neutral condition of the transmission. The ring gear 88 is driven and may be used with the brake 21 engaged for power take-off purposes as just discussed, and in connection with any control (not shown) for putting the transmission in its various drives and ranges, an extra manual position for this control specifically for power take-off may be saved. An additional advantage in maintaining the brake 21 engaged in neutral condition of the transmission lies in the fact that the parts of the front planetary assembly A will be rotating slowly instead of rapidly which would be the case if all of the friction engaging mechanisms of the transmission were released and only the one-way brake 67 were active. The front gearing assembly A with the brake 21 engaged will be operating as in third speed forward drive instead of first speed, and the gear noise from the front assembly A is thus reduced for the neutral condition of the transmission. In addition, noting in particular the last table laid out above, the starting gears preferably are first and third forward drives and also reverse (Rev.₁ in the first table set forth above). By applying the brake 21 for the neutral condition of the transmission, a start in any of the above drives necessitates the application of fluid pressure to the fluid piston for only one of the friction devices for engaging the device. A smaller capacity fluid source is needed for engaging one brake instead of two simultaneously and this constitutes a major advantage of maintaining the brake 21 applied in neutral condition of the transmission. The brake 24 is the only friction device that must be applied for a start in third speed, with the brake 21 being previously applied, and brakes 24 and 23 are respectively applied for starting in first speed forward or reverse with an exhausting or dis-application of pressure to the servomotor for the brake 21. A similar operation is possible, if the brake 21 were maintained disengaged for starts in first speed forward or reverse, but maintaining the brake 21 applied is particularly advantageous when the start is made in third speed ratio, since application of brakes 21 and 24 simultaneously is required for the third speed drive if the brake 21 has not been previously applied.

The illustrated transmission advantageously provides eight forward speed drives which are of sufficient number for satisfactorily driving a heavy truck under the various road conditions ordinarily encountered. Only the single brake 24 need be engaged for completing the first speed drive. In order to change from first speed drive to second speed drive or from fifth speed drive to sixth speed drive, it is only necessary to engage the single brake 22. In changing from second to third, third to fourth, sixth to seventh, and seventh to eighth, it is only necessary to drop one friction engaging device and engage one other. In changing from fourth to fifth speed ratio, it is necessary to disengage the clutch 19 and also to disengage the brake 24 and engage the clutch 20. Insofar as the unit A is concerned, the one-way brake 67 automatically engages to complete the fifth speed drive in this unit, and only the single friction device 20 need be engaged so that substantially no engagement timing problem exists.

The transmission as illustrated is particularly adaptable for providing equally spaced ratios, that is, each of the ratios from the seventh down to the first is a constant, such as 1.37 shown in the above table, multiplied by the next higher speed ratio. This arrangement of ratios is particularly suitable for a heavy truck to give the truck the acceleration and power required under all conditions of operation. The tandem arrangement of the two planetary assemblies A and B easily provides this arrangement of ratios with the first planetary assembly having four speed ratios of drive in the same direction and the second planetary assembly B having two speed ratios of drive in the same direction and also a reverse drive. In order to obtain this arrangement of ratios, the rear unit B is so designed as to provide a speed ratio of the constant multiplied by the lowest ratio of the first unit A. In the table above set forth, the constant is 1.37 and the lowest ratio in the front unit A is 2.56 which multiplied together gives 3.52, the ratio of the rear unit.

The assembly of struts 102 is simple and economical to manufacture, being preferably formed from struts in the form of sectors held at their outer peripheries and acted on by a piston at their inner peripheries. Since the individual sectors are used, the strut assembly does not have the usual over center effect of an ordinary Belleville type washer, although the same engaging force is transmitted from piston to pressure plate. In connection with the clutch 20 with which this assembly is used, it will be noted that there is provided a helical return spring 103 utilized in lieu of any piston returning effect of a Belleville type washer.

I wish it to be understood that my invention is not to be limited to the specific constructions and arrangements shown and described, except only insofar as the claims may be so limited, as it will be understood to those skilled in the art that changes may be made without departing from the principles of the invention. In particular, I wish it to be understood that although I have described for purposes of example a certain embodiment of my invention producing speed ratios having certain numerical values, my invention is not to be limited to transmissions with such ratios, as it will be apparent to anyone skilled in transmission design that the gear sizes of the transmission of the invention may be changed to provide speed ratios having different numerical values.

I claim:

1. In transmission mechanism, the combination of an input shaft, an output shaft, a planet gear set having three elements drivingly interconnected by gearing one of which elements is driven by said input shaft and a second of which is connected to drive said output shaft and the third of which constitutes a reaction element, a one-way brake for said reaction element for completing a change speed drive through said gear set between said shafts, and a second planet gear set also having three elements drivingly interconnected by gearing one of which elements is in driving relation with said output shaft and a second of which is connected with said first-named reaction element, and a brake for the third element of said second gear set for causing said second gear set to drive said reaction element of said first gear set and release said one-way brake for causing said output shaft to rotate at a faster speed with respect to said input shaft and provide a higher ratio drive between the shafts.

2. In transmission mechanism, the combination of an input shaft, an output shaft, a planet gear set having three elements drivingly interconnected by gearing one of which elements is driven by said input shaft and a second of which is connected to drive said output shaft and the third of which constitutes a reaction element, a one-way brake for said reaction element for completing a change speed drive between said shafts, a second planet gear set also having three elements drivingly interconnected by gearing one of which elements is connected to said first-named reaction element and the second of which is connected with said output shaft, a third planet gear set also having three elements drivingly interconnected by gearing one of which elements is connected to said first-named reaction element and a second of which is connected with said input shaft, and a friction brake for the third element of said two last-named planet gear sets for rendering the planet gear sets respectively operable to drive said first-named reaction element at different speeds in the forward direction to release said one-way brake and cause said output shaft to rotate at faster speeds and at higher ratios.

3. In transmission mechanism, the combination of a drive shaft, a driven shaft, a hydrodynamic coupling device driven by said drive shaft, a planet gear set having three elements drivingly interconnected by gearing one of which elements is driven by said hydrodynamic device and a second of which is connected to drive said driven shaft and the third of which constitutes a reaction element, a one-way brake for said reaction element for completing a change speed drive through said hydrodynamic device and said gear set between said shafts, a second planet gear set also having three elements drivingly interconnected by gearing one of which elements is connected to said first-named reaction element and a second of which is connected to one of the other two of said elements of said first-named gear set and the third of which constitutes a reaction element, a friction brake for said reaction element of said second gear set for causing said second gear set to drive said first-named reaction element and cause said one-way brake to release for driving said driven shaft at an increased speed ratio, and a friction clutch for connecting directly said drive and driven shafts exclusive of said hydrodynamic coupling device.

4. In transmission mechanism, the combination of an input shaft, an output shaft, a first planet gear set having a sun gear and a ring gear and a planet gear in mesh with said sun and ring gears and a carrier for said planet gear, said sun gear being connected with said input shaft and said carrier being connected with said output shaft, a one-way brake for said ring gear for completing a change speed drive through said gear set between said shafts, a second planet gear set having a sun gear and a ring gear and a pair of intermeshed planet gears, one of which is also in mesh with said sun gear and the other of which is also in mesh with said ring gear and a carrier for said planet gears, said last named carrier being connected to said output shaft and said two ring gears being connected together, and a brake for said sun gear of said second gear set for causing said second gear set to drive said ring gear of said first gear set and release said one-way brake for causing said output shaft to rotate at a faster speed with respect to said input shaft and provide a higher ratio drive between said shafts.

5. In transmission mechanism, the combination of an input shaft, an output shaft, a first planet gear set having a sun gear and a ring gear and a planet gear in mesh with the sun and ring gears and a carrier for said planet gear, said sun gear being connected to be driven by said input shaft and said carrier being connected to drive said output shaft, a one-way brake for said ring gear for completing a change speed drive between said shafts, a second planet gear set having a sun gear and a ring gear, and a pair of intermeshed planet gears one of which is also in mesh with said sun gear and the other of which is also in mesh with said ring gear and a carrier for said planet gears, said last named ring gear being connected to said ring gear of said first gear set and said carrier of said second planet gear set being connected with said output shaft, a brake for said sun gear of said second gear set for rendering said second gear set operable to drive said ring gear of said first gear set to cause said output shaft to rotate at a faster speed, a third planet gear set having a sun gear and a ring gear and a pair of intermeshed planet gears one of which is also in mesh with said sun gear and the other of which is also in mesh with said ring gear and a carrier for said planet gears, said last named carrier being connected with said input shaft and said last named ring gear being connected to said ring gear of said first gear set, and a brake for said last named sun gear for rendering said third planet gear set operable to drive said ring gear of said first gear set to cause said output shaft to rotate at another faster speed.

References Cited in the file of this patent

UNITED STATES PATENTS

| | | |
|---|---|---|
| 686,786 | Upton | Nov. 19, 1901 |
| 2,263,159 | Berger | Nov. 18, 1941 |
| 2,332,593 | Nutt et al. | Oct. 26, 1943 |
| 2,601,151 | Keller | June 17, 1952 |
| 2,638,196 | Wilson | May 12, 1953 |
| 2,645,137 | Roche | July 14, 1953 |
| 2,693,721 | Forster | Nov. 9, 1954 |
| 2,702,618 | Baker et al. | Feb. 22, 1955 |
| 2,718,271 | Jedrzykowski | Sept. 20, 1955 |
| 2,720,124 | Polumski | Oct. 11, 1955 |
| 2,725,763 | Stoeckicht | Dec. 6, 1955 |
| 2,737,827 | Seybold | Mar. 13, 1956 |
| 2,786,365 | Lammerz | Mar. 26, 1957 |
| 2,812,670 | Winther | Nov. 12, 1957 |
| 2,854,862 | Foerster | Oct. 7, 1958 |
| 2,865,227 | Kelly | Dec. 23, 1958 |